United States Patent [19]

Hirose

[11] Patent Number: 5,411,446

[45] Date of Patent: May 2, 1995

[54] HYDRAULIC CONTROL SYSTEM FOR AUTOMATIC TRANSMISSION

[75] Inventor: Ikuo Hirose, Fuji, Japan

[73] Assignee: Jatco Corporation, Fuji, Japan

[21] Appl. No.: 67,580

[22] Filed: May 26, 1993

[30] Foreign Application Priority Data

Jun. 3, 1992 [JP] Japan .................... 4-168497

[51] Int. Cl.$^6$ .............................. F16H 5/60
[52] U.S. Cl. ..................... 475/120; 475/128
[58] Field of Search ............... 475/116, 128, 127, 122, 475/120

[56] References Cited

U.S. PATENT DOCUMENTS

| | | | |
|---|---|---|---|
| 2,890,603 | 6/1959 | Harris et al. | 475/116 X |
| 3,938,410 | 2/1976 | Dach et al. | 475/122 |
| 4,262,554 | 4/1981 | Ahlen et al. | 475/116 X |
| 4,395,927 | 8/1983 | Muller et al. | 475/127 |
| 4,555,964 | 12/1985 | Sugano | 475/128 X |
| 4,724,726 | 2/1988 | Knecht | 475/128 X |
| 5,334,114 | 8/1994 | Ando et al. | 475/120 X |

FOREIGN PATENT DOCUMENTS

2-173466 7/1990 Japan .

*Primary Examiner*—Edward K. Look
*Assistant Examiner*—John Ryznic
*Attorney, Agent, or Firm*—Foley & Lardner

[57] ABSTRACT

A hydraulic control system for an automatic transmission comprises a plurality of shift valves which connect a first hydraulic passage communicating with an N+2 speed apply chamber to a second hydraulic passage communicating with an N+1 speed release chamber upon N speed, where N is a whole number equal to or greater than 1.

1 Claim, 12 Drawing Sheets

| | C18 | C20 | C22 | C24 | B28 | B26 | OWC 30 | OWC 29 | GEAR RATIO | $\alpha_1 = 0.440$ $\alpha_2 = 0.493$ |
|---|---|---|---|---|---|---|---|---|---|---|
| D RANGE 1st SPEED | | | O | | | | O | O | $\dfrac{1+\alpha_2}{\alpha_2}$ | 3.027 |
| D RANGE 2nd SPEED | | | O | | O | | O | | $\dfrac{\alpha_1+\alpha_2+\alpha_1\alpha_2}{\alpha_2(1+\alpha_1)}$ | 1.619 |
| D RANGE 3rd SPEED | | O | O | | | | O | | 1 | 1.000 |
| D RANGE 4th SPEED | | O | (O) | | O | | | | $\dfrac{1}{1+\alpha_1}$ | 0.694 |
| ENGINE BRAKE STATE 1st SPEED | | | (O) | | | O | (O) | (O) | | |
| ENGINE BRAKE STATE 2nd SPEED | | | (O) | O | O | | (O) | | | |
| ENGINE BRAKE STATE 3rd SPEED | | O | (O) | O | | | (O) | | | |
| ENGINE BRAKE STATE 4th SPEED | | O | (O) | | O | | | | | |
| REVERSE | O | | | | | O | | | $-\dfrac{1}{\alpha_1}$ | -2.272 |

INPARENTHESES : NO RELATION TO POWER TRANSMISSION

HYDRAULIC CONTROL SYSTEM FOR AUTOMATIC TRANSMISSION

BACKGROUND OF THE INVENTION

The present invention relates to a hydraulic control system for an automatic transmission.

Figure 12:
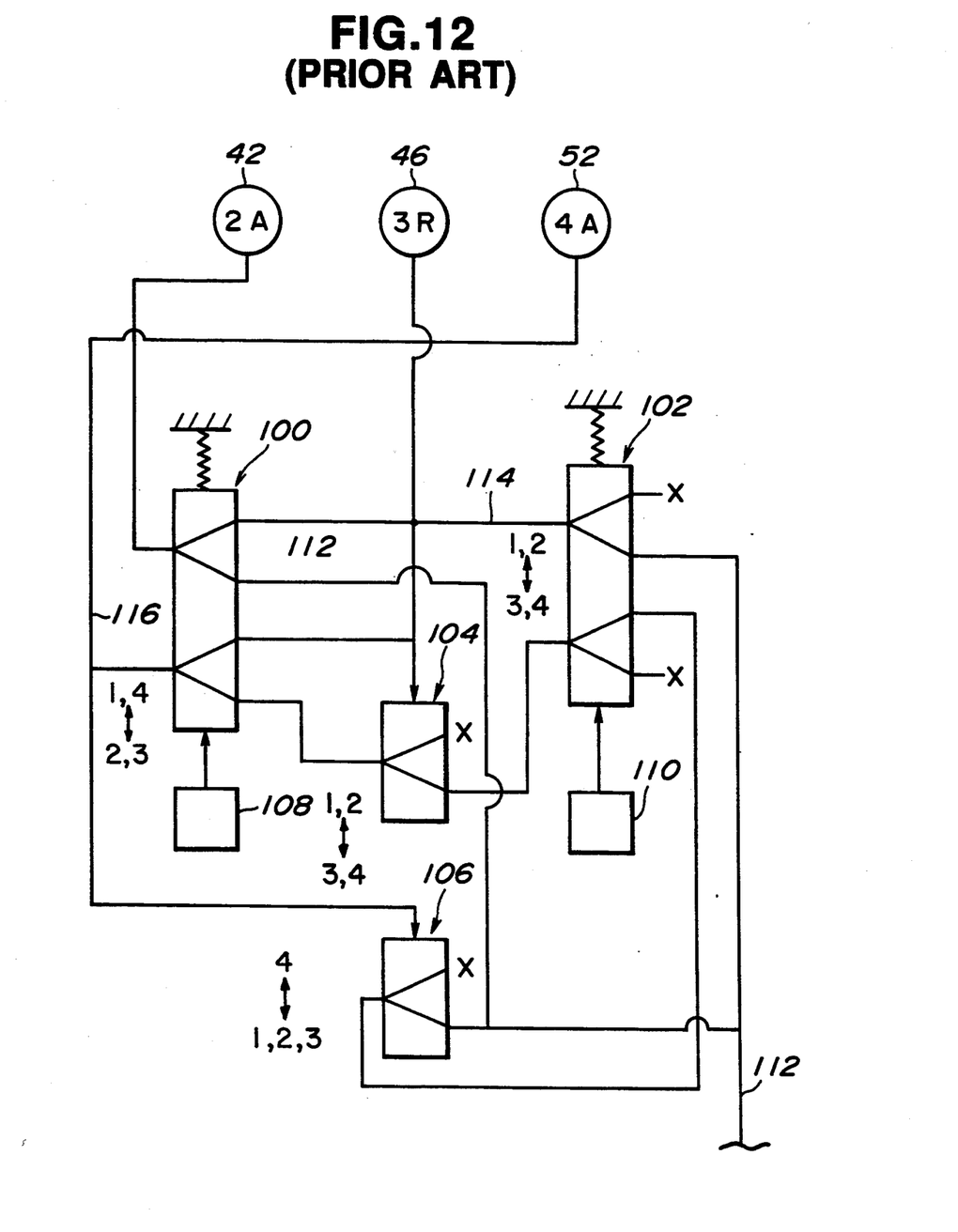
FIG. 12 is a view similar to FIG. 11, showing a known hydraulic circuit.

One of prior art hydraulic control system for an automatic transmission is disclosed, for example, in JP-A 2-178466. Referring to FIG. 12 which shows only a part relative to shift between second, third, and fourth speeds, this hydraulic circuit is used in the same power transmission mechanism as that one which will be described later in connection with preferred embodiments of the present invention. This power transmission mechanism is for the use of four forward speeds, and has a brake which is engaged at second speed, released at third speed, and engaged at fourth speed. Operation of this brake is controlled by a hydraulic servo apparatus which has a second speed apply chamber 42, a third speed release chamber 46, and a fourth speed apply chamber 52. When supplying hydraulic pressure, the second speed apply chamber 42 makes a band brake engaged. When supplying hydraulic pressure, the third speed release chamber 46 makes the band brake released even if the second speed apply chamber 42 undergoes hydraulic pressure. When supplying hydraulic pressure, the fourth speed apply chamber 52 makes the band brake engaged regardless of the state of hydraulic pressure within the second speed apply chamber 42 and the third speed release chamber 46. The hydraulic circuit as shown in FIG. 12 includes a shift valve 100, a shift valve 102, a 4-2 sequence valve 104, and a 4-2 relay valve 106. The shift valves 100, 102 are switched by signal pressure out of solenoids 108, 110, respectively. Upon second speed, the shift valve 100 is positioned on the side that a hydraulic passage 112 receiving hydraulic pressure in D-range communicates with the second speed apply chamber 42, whereas the shift valve 102 is positioned on the side that hydraulic passage 114 communicating with the third speed release chamber 46 is drained. Upon third speed, the shift valve 100 occupies the same position as that one upon second speed, whereas the shift valve 102 is positioned on the side that the hydraulic passage 112 receiving hydraulic pressure in D-range communicates with the third speed release chamber 46. Upon fourth speed, the shift valve 102 occupies the same position as that one upon third speed, whereas the shift valve 100 is positioned on the side that a hydraulic passage 114 communicating with the third speed release chamber 46 is connected to a hydraulic passage 116 communicating with the fourth speed apply chamber 52.

The 4-2 sequence valve 104 and the 4-2 relay valve 106 are arranged to carry out 4-2 shift and 3-2 shift at a predetermined timing. That is, when shifting from fourth speed to second speed, both shift valves 100, 102 are switched at the same time. In this case, since the band brake is in the engagement state both at second speed and at fourth speed, it is necessary to avoid the band brake being released during shift in view of measures against shift shock. Thus, the 4-2 sequence valve 104 is constructed to be switched by hydraulic pressure within the hydraulic passage 114, i.e., hydraulic pressure within the third speed release chamber 46, and it functions so that until this hydraulic pressure reduces, hydraulic pressure within the fourth speed apply chamber 52 fails to decrease. This allows hydraulic pressure within the third speed release chamber 46 to be discharged with the engagement state of the band brake maintained, carrying out 4-2 shift. In addition to the 4-2 sequence valve 104, the 4-2 relay valve 106 is arranged for smooth operation of 3-2 shift. That is, upon 3-2 shift, the shift valve 102 is switched to thereby discharge hydraulic pressure within the third speed release chamber 46. At this moment, since the fourth speed apply chamber 52 is connected to the hydraulic passage 112 through the shift valve 100, the 4-2 sequence valve 104, and the shift valve 102, the fourth speed apply chamber 52 temporarily undergoes hydraulic pressure, resulting in possible shift of third speed→fourth speed→second speed. That is, since the fourth speed apply chamber 52 is supplied with hydraulic pressure until hydraulic pressure within the third speed release chamber 46 decreases, it is necessary to cut it off upon 3-2 shift. This is carried out by the 4-2 relay valve 106.

However, such known hydraulic control system for an automatic transmission is constructed so that the 4-2 sequence valve is arranged for appropriate operation of 4-2 shift, and the 4-2 relay valve is arranged to prevent inconveniences from occurring upon 3-2 shift, necessitating two valves in addition to the shift valves.

It is, therefore, an object of the present invention to provide a hydraulic control system for an automatic transmission which allows smooth shift without any valves for timing adjustment.

SUMMARY OF THE INVENTION

There is provided, according to the present invention, in an automatic transmission, the automatic transmission having a brake to be engaged at an N speed and an N+2 speed and released at an N+1 speed:

a hydraulic servo apparatus arranged to control the brake, the hydraulic control system having an N speed apply chamber which engages the brake when undergoing hydraulic pressure, an N+1 speed release chamber which releases the brake when undergoing hydraulic pressure even with said N speed apply chamber undergoing hydraulic pressure and an N+2 speed apply chamber which engages the brake when undergoing hydraulic pressure regardless of the state of hydraulic pressure within said N speed apply chamber and said N+1 speed release chamber;

a plurality of shift valves hydraulically connected to said N speed apply chamber, said N+1 speed release chamber and said N+2 speed apply chamber, said plurality of shift valves controlling hydraulic pressure to be supplied to and discharged from said N speed apply chamber, said N+1 speed release chamber and said N+2 speed apply chamber;

a first hydraulic passage hydraulically connected to said N+2 speed apply chamber; and a second hydraulic passage hydraulically connected to said N+1 speed release chamber, said plurality of shift valves connecting said first hydraulic passage to said second hydraulic passage upon the N speed, where N is a whole number equal to or greater than 1.

DETAILED DESCRIPTION OF THE INVENTION

Referring to FIGS. 1-7, there is shown a first preferred embodiment of the present invention.

Figure 1:
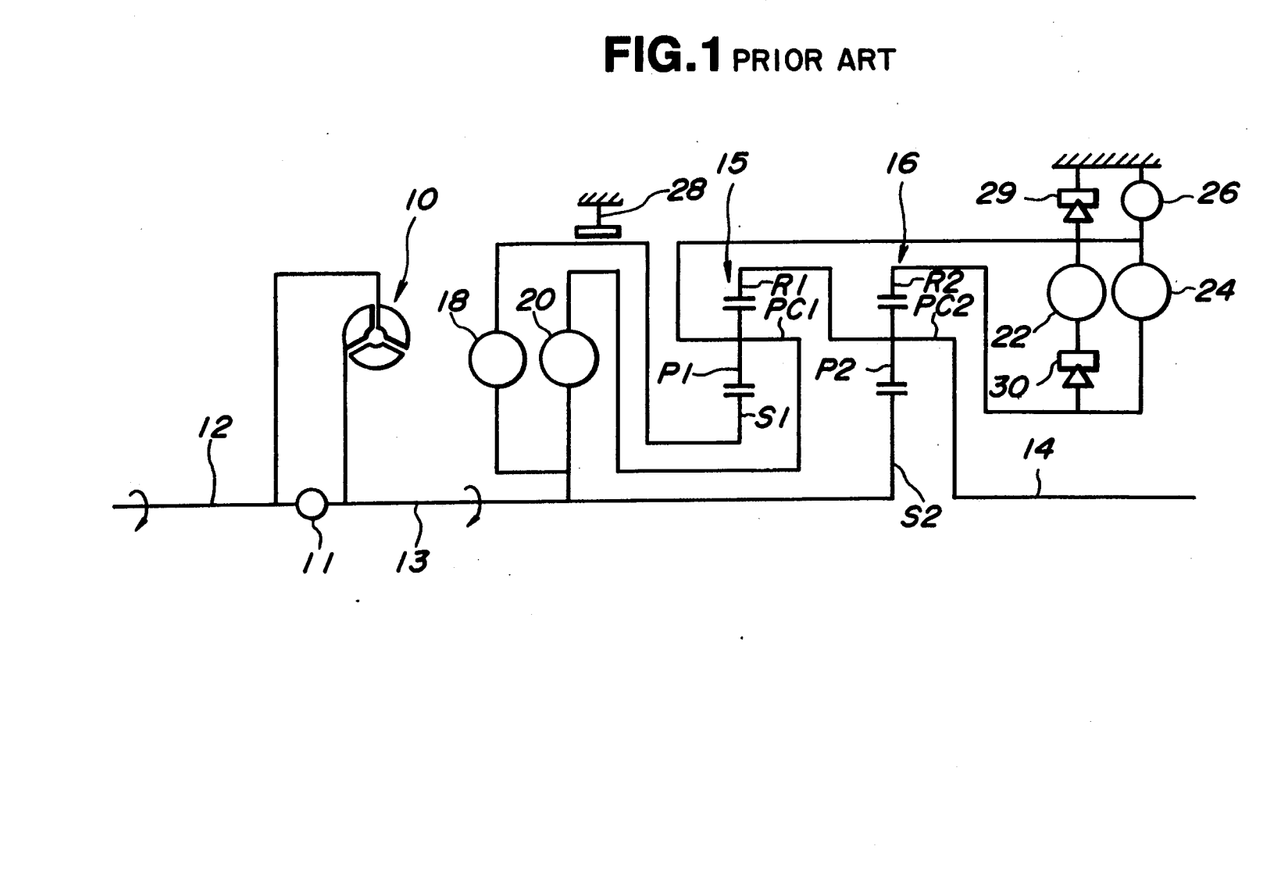
FIG. 1 is a skeleton drawing showing a power transmission mechanism of an automatic transmission.

Referring first to FIG. 1, there is shown a power transmission mechanism for an automatic transmission of four forward speeds and one reverse speed with over-drive. The power transmission mechanism includes an input shaft 13 which receives torque from an engine output shaft 12 through a torque converter 10, an output shaft 14 which transmits driving force to a final drive apparatus, a first planetary gear set 15, a second planetary gear set 16, a reverse clutch 18, a high clutch 20, a forward clutch 22, an overrunning clutch 24, a low and reverse brake 26, a band brake 28, a low one-way clutch 29, and a forward one-way clutch 30. The torque converter 10 includes a lockup clutch 11. The first planetary gear set 15 comprises a sun gear S1, an internal gear R1, and a carrier PC1 for supporting a pinion gear P1 engaged with the two bears S1, R1 at the same time, whereas the second planetary gear set 16 comprises a sun gear S2, an internal gear R2, and a carrier PC2 for supporting a pinion gear P2 engaged with the two gears S2, R2 at the same time. The carrier PC1 is connectable to the input shaft 13 through the high clutch 20, whereas the sun gear S1 is connectable thereto through the reverse clutch 18. The carrier PC1 is also connectable to the internal gear R2 through the forward clutch 22 and the forward one-way clutch 30 connected in series therewith, or the forward clutch 22 and the overrunning clutch 24 arranged in parallel with the forward one-way clutch 30. The sun gear S2 is always connected to the input shaft 13, whereas the internal gear R1 and the carrier PC2 are always connected to the output shaft 14. The low and reverse brake 26 can put the carrier PC1 stationary, whereas the band brake 28 can put the sun gear S1 stationary. The low one-way clutch 29 is arranged to allow normal rotation of the carrier PC1, i.e., rotation in the same direction as that of the engine output shaft 12, and not to allow reverse rotation thereof, i.e., rotation in the direction opposite to normal rotation.

Figure 2:
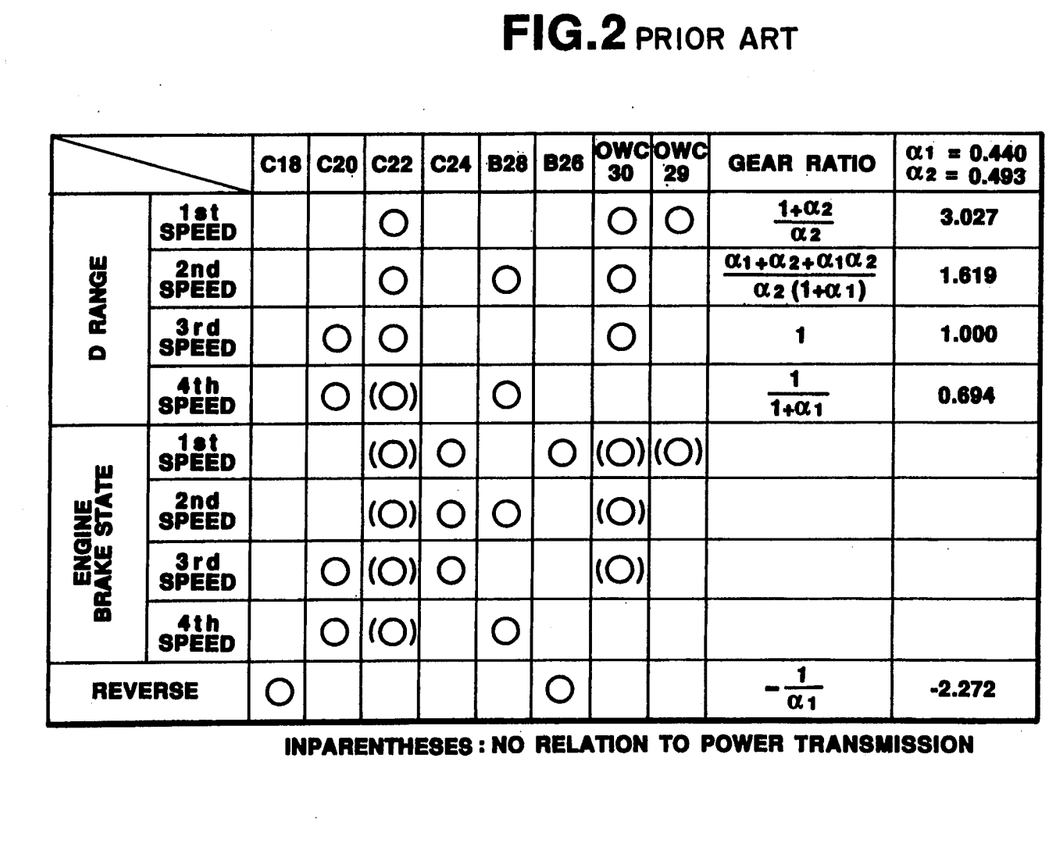
FIG. 2 is a table showing a combination of elements operating in each gear ratio of the automatic transmission.

The power transmission mechanism can change the rotational state of elements S1, S2, R1, R2, PC1, PC2 of the first and second planetary gear sets 15, 16 by operating the clutches 18, 20, 22, 24, and brakes 26, 28 in various combinations, thereby diversely altering rotational speed of the output shaft 14 relative to rotational speed of the input shaft 13. Four forward speeds and one reverse speed can be obtained by operating the clutches 18, 20, 22, 24, and the brakes 26, 28 in the combinations as shown in FIG. 2. In FIG. 2, a cell with circle designates a clutch or a brake in operation, and $\alpha^1$ and $\alpha^2$ designate ratios of the number of teeth of the sun gears S1, S2 to the number of teeth of the internal gears R1, R2, respectively, and a gear ratio is a ratio of rotational speed of the input shaft 13 to rotational speed of the output shaft 14.

Figure 3:
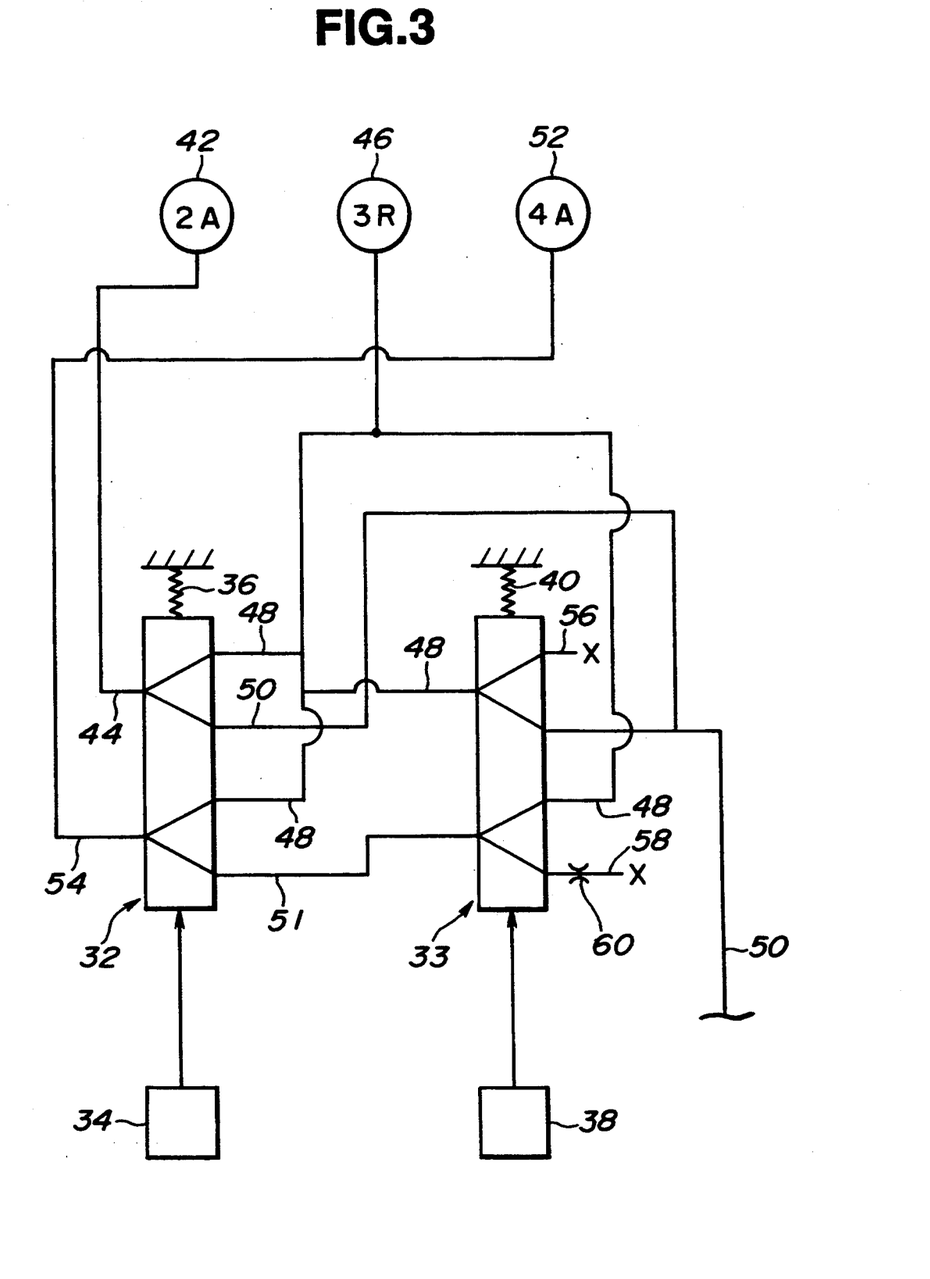
FIG. 3 is a schematic drawing showing a first preferred embodiment of a hydraulic circuit according to the present invention.

Referring to FIG. 3, there is shown a hydraulic circuit pertinent to a control of the band brake 28. This hydraulic circuit includes a shift valve 32 and a shift valve 33. The shift valve 32 is shiftable in two positions by hydraulic pressure out of a solenoid 34 and force of a spring 36. Likewise, the shift valve 33 is shiftable in two positions by hydraulic pressure out of a solenoid 38 and force of a spring 40. The shift valve 32 can connect a hydraulic passage 44 communicating with the second speed apply chamber 42 to a hydraulic passage 48 communicating with the third speed release chamber 46, or a hydraulic passage 50 to be supplied with hydraulic pressure when a manual valve (not shown) is in D-range. Additionally, the shift valve 32 can connect a hydraulic passage 54 communicating with the fourth speed apply chamber 52 to the hydraulic passage 48 or a hydraulic passage 51. The shift valve 33 can connect the hydraulic passage 48 to a drain port 56 or the hydraulic passage 50. Additionally, the shift valve 33 can connect the hydraulic passage 51 to the hydraulic passage 48 or a drain port 58. The drain port 58 is formed with an orifice 60.

Figure 4:
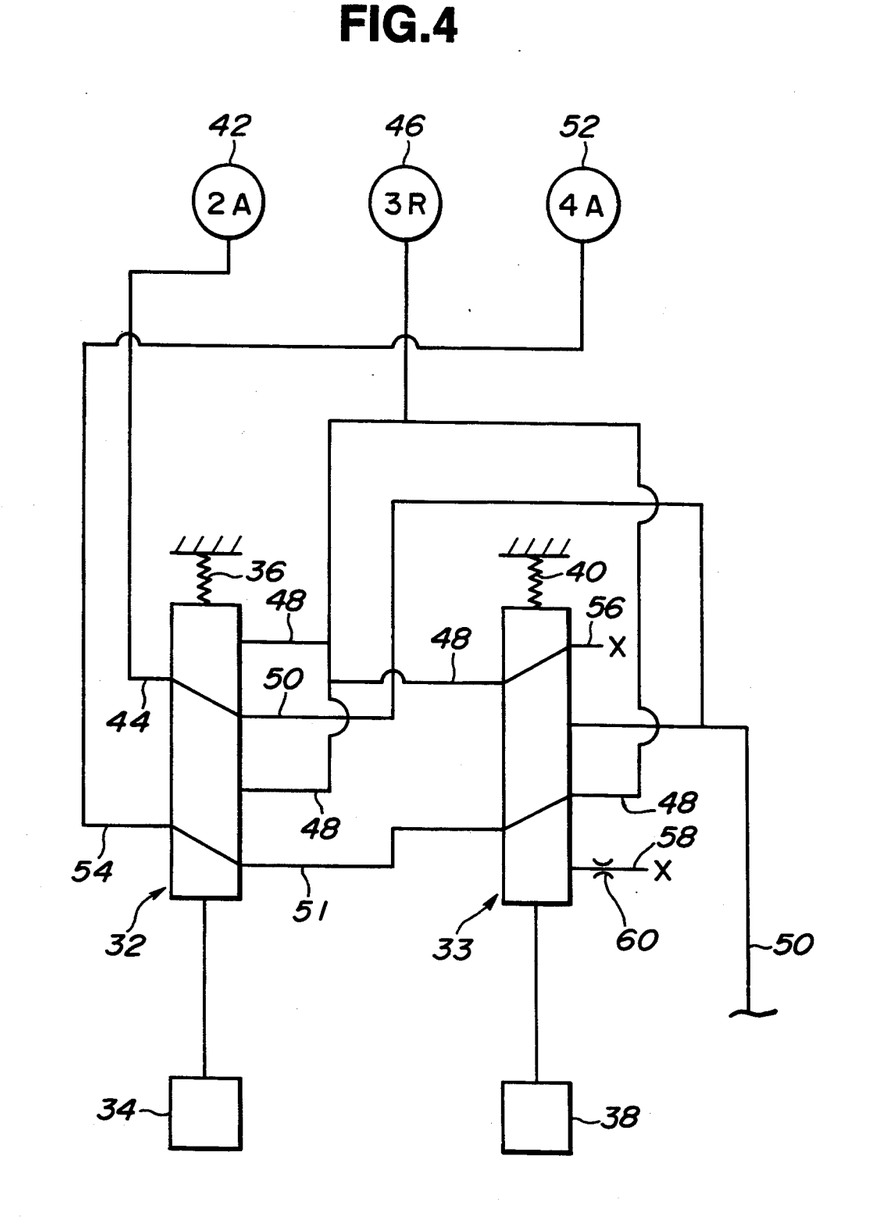
FIG. 4 is a view similar to FIG. 3, showing the hydraulic circuit of FIG. 3 upon second speed.
Figure 5:
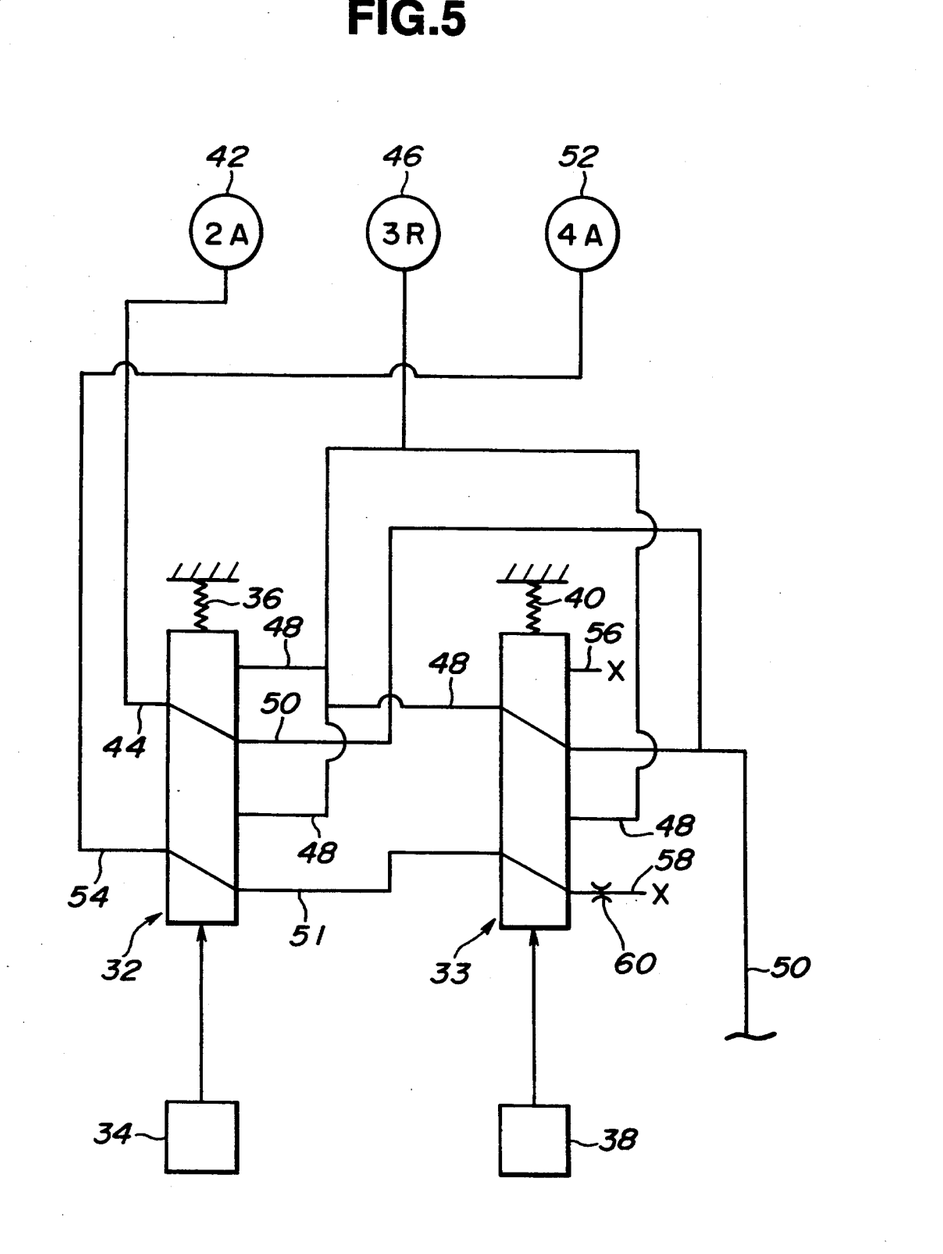
FIG. 5 is a view similar to FIG. 4, showing the hydraulic circuit of FIG. 3 upon third speed.
Figure 6:
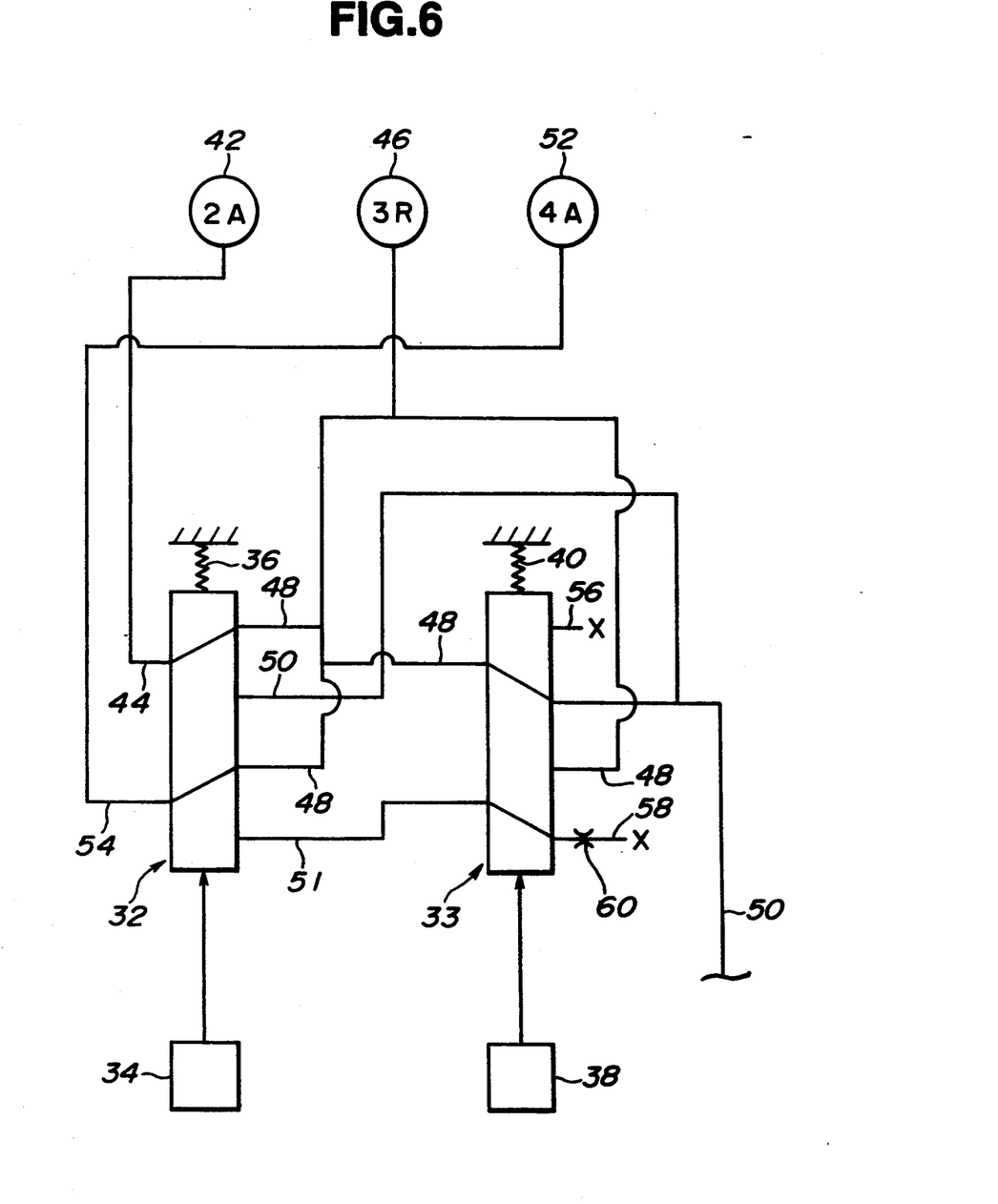
FIG. 6 is a view similar to FIG. 5, showing the hydraulic circuit of FIG. 5 upon fourth speed.
Figure 7:
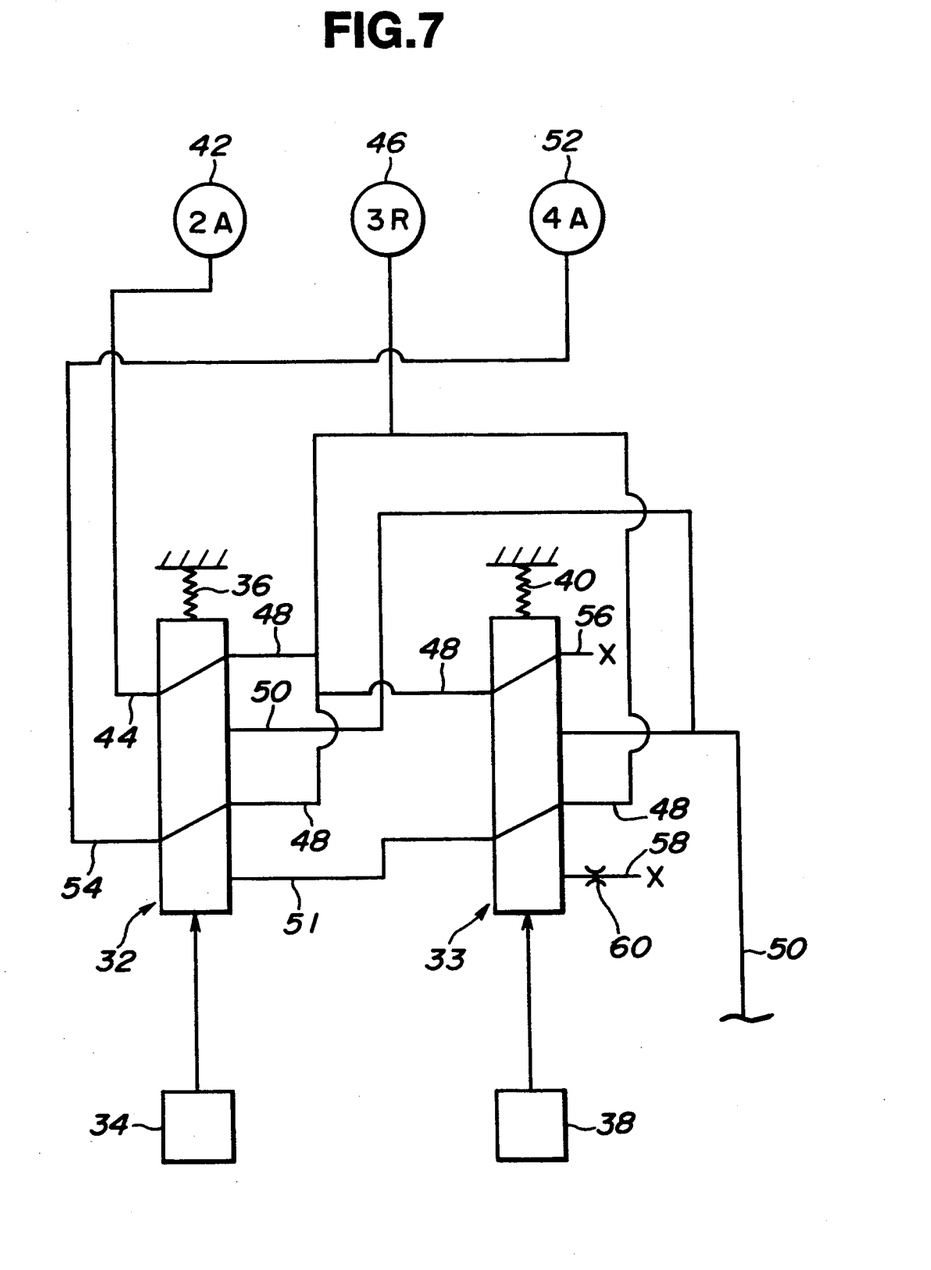
FIG. 7 is a view similar to FIG. 6, showing the hydraulic circuit of FIG. 6 upon first speed.

At second, third, and fourth speeds, the hydraulic circuit assumes the connecting state as shown in FIGS. 4, 5, and 6, respectively, according to ON and OFF of the solenoids 34, 38. At first speed, the hydraulic circuit assumes the connecting state as shown in FIG. 7.

Next, the operation of this embodiment will be described. In the state of fourth speed as shown in FIG. 6, the hydraulic passage 50 is connected to the hydraulic passage 48 through the shift valve 33. Since the hydraulic passage 48 communicates with the third speed release chamber 46, the latter undergoes hydraulic pressure. Additionally, the hydraulic passage 48 is connected to the hydraulic passages 44, 54 through the shift valve 32. Therefore, the second speed apply chamber 42 and the fourth speed apply chamber 52 also undergo hydraulic pressure. As a result, the band brake 28 is engaged by force of hydraulic pressure within the fourth speed apply chamber 52.

Referring to FIG. 4, when shifting from fourth speed to second speed, both shift valves 32, 33 are switched at the same time. Switching of the shift valve 32 puts the hydraulic passage 44 in a connection with the hydraulic passage 50. Hydraulic pressure within the hydraulic passage 50 is equal to that one within the hydraulic passage 48 which was connected to the hydraulic passage 44 until immediately before the switching, so that hydraulic pressure within the second speed apply chamber 42 is maintained without any variation. On the other hand, hydraulic pressure within the third speed release chamber 46 begins to be discharged from the drain port 56 through the hydraulic passage 48 and the shift valve 33. Likewise, hydraulic pressure within the fourth speed apply chamber 52 is discharged from the drain port 56 through the hydraulic passage 54, the shift valve 32, the hydraulic passage 51, the shift valve 33, the hydraulic passage 48, and the shift valve 33. Due to discharge from the same drain port 56, hydraulic pressures within the third speed release chamber 46 and the fourth speed apply chamber 52 decrease at the same speed. Therefore, while hydraulic pressure remains within the third speed release chamber 46, the fourth speed apply chamber 52 undergoes the same hydraulic pressure. As a result, the band brake 28 is kept engaged by hydraulic pressure within the fourth speed apply chamber 52 until hydraulic pressure within the third speed release chamber 48 decreases. When hydraulic pressure within the third speed release chamber 46 reduces, the band brake 28 is kept engaged by hydraulic pressure within the second speed apply chamber 42. Therefore, the band brake 28 is always kept engaged during shift.

Next, when shifting from third speed to second speed, the shift valve 33 is switched from the state as shown in FIG. 5 to the state as shown in FIG. 4. In the state as shown in FIG. 5, the third speed release chamber 46 undergoes hydraulic pressure within the hydraulic passage 50 through the shift valve 33 and the hydraulic passage 48. The second speed apply chamber 42 undergoes hydraulic pressure within the hydraulic passage 50 through the shift valve 32 and the hydraulic passage 44. The fourth speed apply chamber 52 is drained to the drain port 58 through the hydraulic passage 54, the shift valve 32, the hydraulic passage 51, and the shift valve 33. Therefore, the band brake 28 is in the released state by hydraulic pressure within the third speed release chamber 46 although the second speed apply chamber 42 undergoes hydraulic pressure. When commanding shift from third speed to second speed, the shift valve 33 is switched as shown in FIG. 4. That is, hydraulic pressure within the third speed release chamber 46 begins to be discharged to the drain port 56 through the hydraulic passage 48 and the shift valve 33. It is to be noted that since the hydraulic passage 48 is connected to the fourth speed apply chamber 52 through the shift valve 33, the hydraulic passage 51, the shift valve 32, and the hydraulic passage 54, the fourth speed apply chamber 52 undergoes the same hydraulic pressure while hydraulic pressure within the third speed release chamber 46 is discharged by the stroke of pistons for second and third speeds. However, at the same time that the band brake 28 is engaged by the stroke of a piston for fourth speed, the stroke of the pistons for second and third speeds discharging hydraulic fluid within the third release chamber 46 comes to an end, and the band brake 28 is engaged by force of hydraulic pressure within the second speed apply chamber 42. That is, the band brake 28 is engaged by force of hydraulic pressure within the second speed apply chamber 42 and the fourth speed apply chamber 52. Therefore, inconveniences fail to occur upon 3-2 shift.

Upon third speed as shown in FIG. 5, the third speed release chamber 46 is disconnected from the fourth speed apply chamber 52, and the fourth speed apply chamber 52 is discharged from the drain port 58 through the hydraulic passage 54, the shift valve 32, the hydraulic passage 51, and the shift valve 33.

That is, 4-2 shift and 3-2 shift can smoothly be carried out without valves for timing adjustment such as a 4-2 sequence valve and a 4-2 relay valve.

Figure 8:
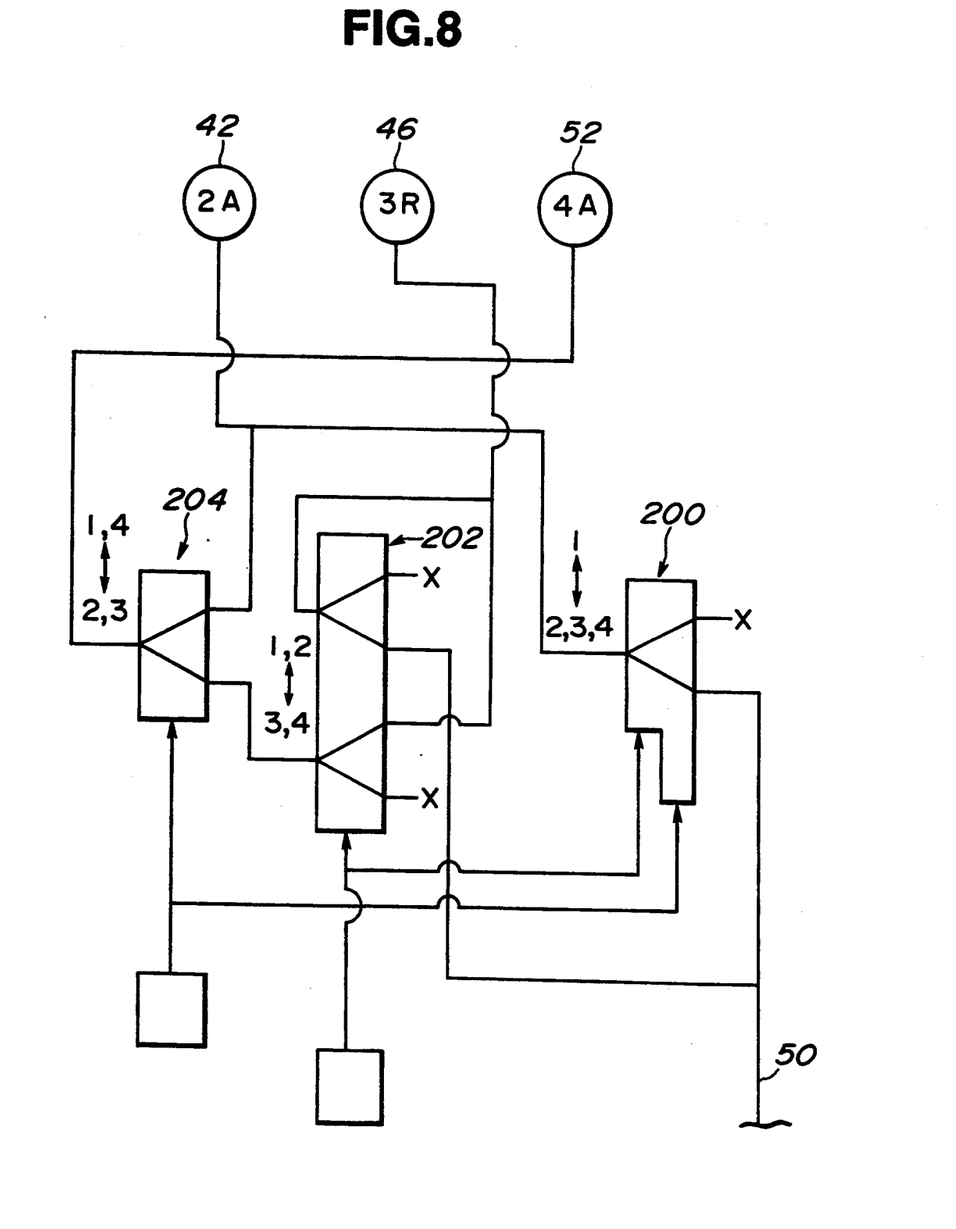
FIG. 8 is a view similar to FIG. 7, showing a second preferred embodiment of a hydraulic circuit.
Figure 9:
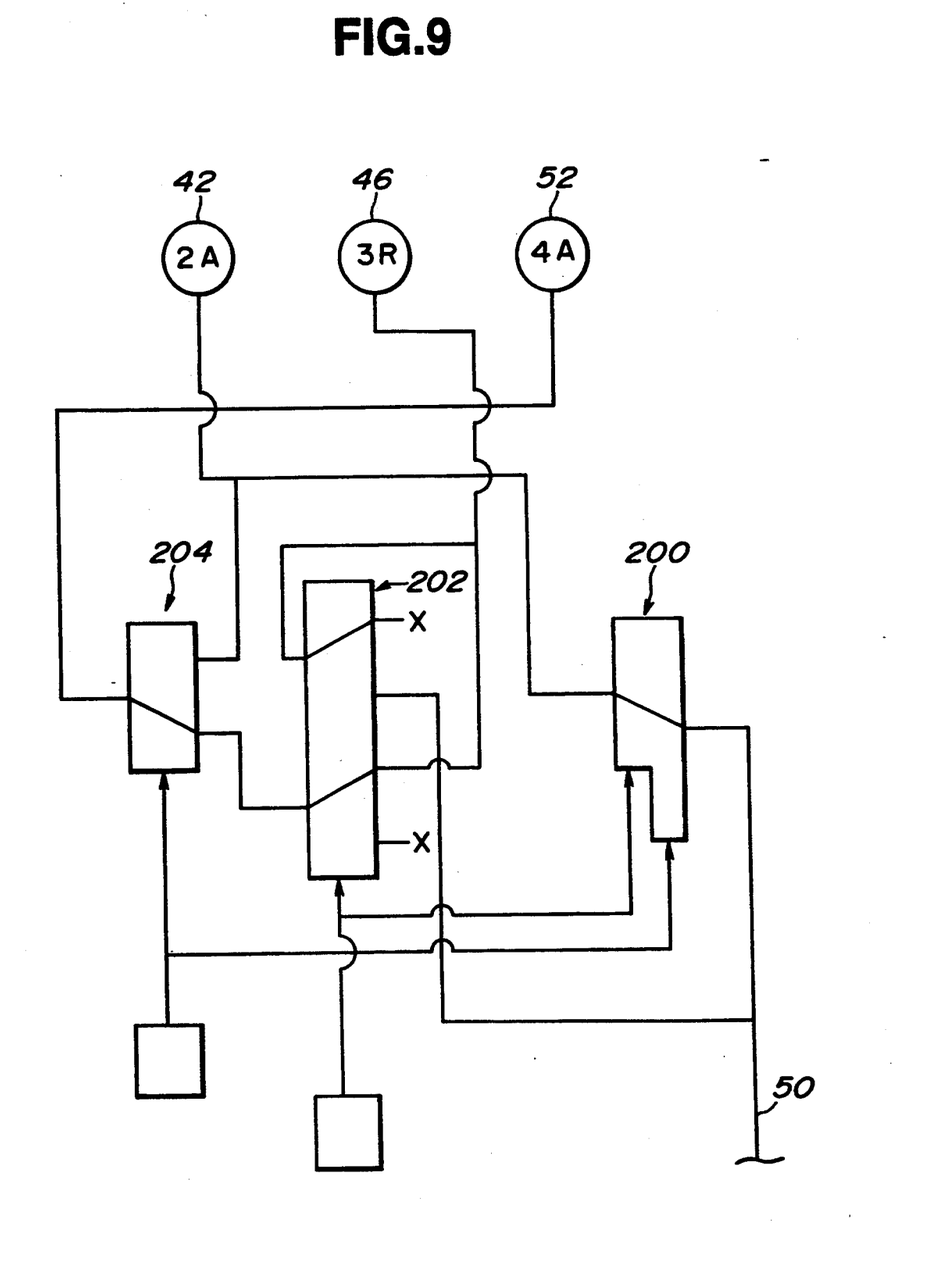
FIG. 9 is a view similar to FIG. 8, showing the hydraulic circuit of FIG. 8 upon second speed.

Referring next to FIG. 8, there is shown a second preferred embodiment of the present invention. This embodiment shows a case of disposing three shift valves. That is, there are arranged a 1-2 shift valve 200, a 2-3 shift valve 202, and a 3-4 shift valve 204, which are connected to the second speed apply chamber 42, the third speed release chamber 46, and the fourth speed apply chamber 52, respectively, as shown in FIG. 8. FIG. 9 shows the state of this embodiment upon second speed. In this state, hydraulic pressure within the fourth speed apply chamber 52 and that one within the third speed release chamber 46 are discharged from the shift valve 202 through the same hydraulic passage, obtaining the same operation as that of the first preferred embodiment.

Figure 10:
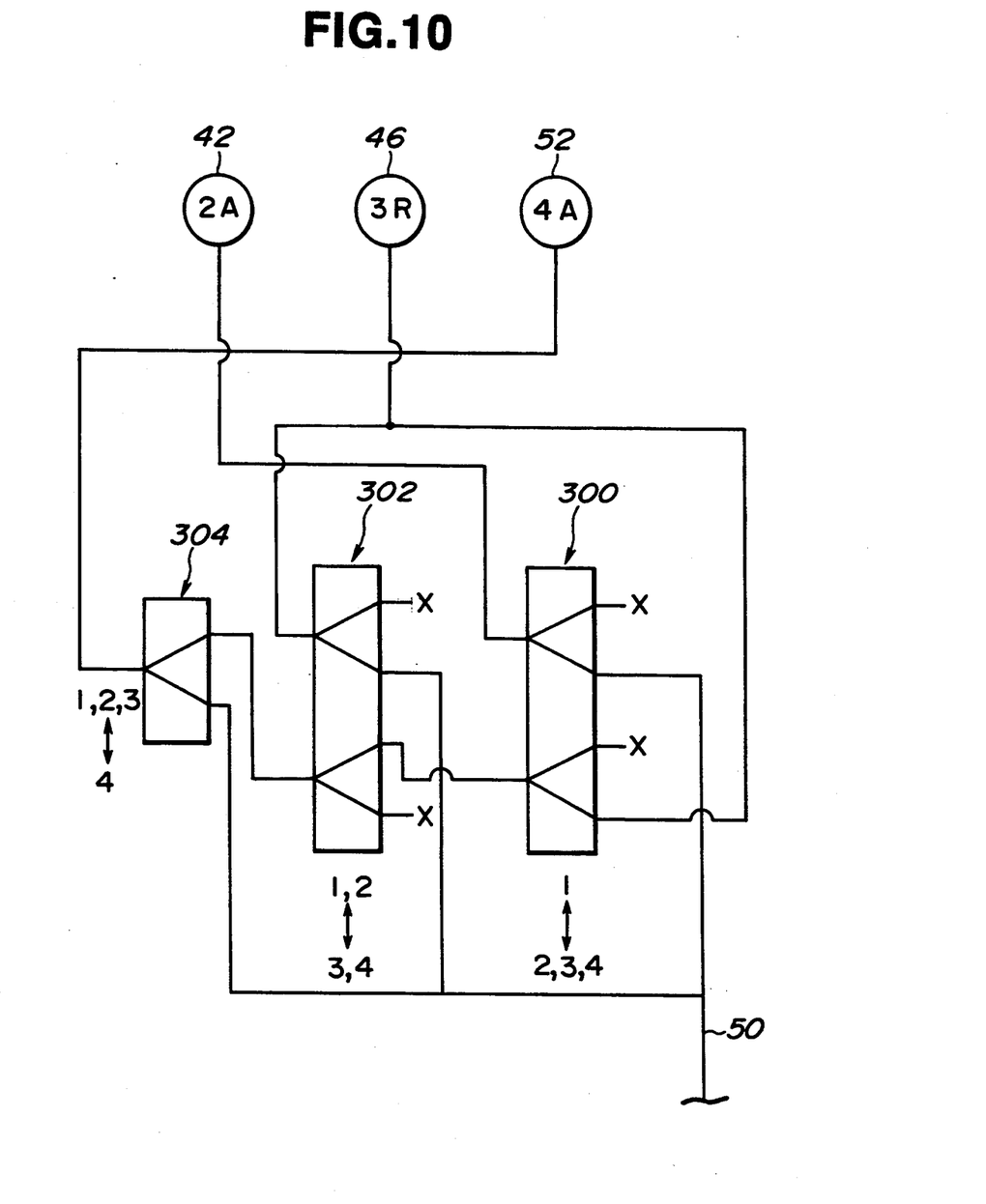
FIG. 10 is a view similar to FIG. 9, showing a third preferred embodiment of a hydraulic circuit.
Figure 11:
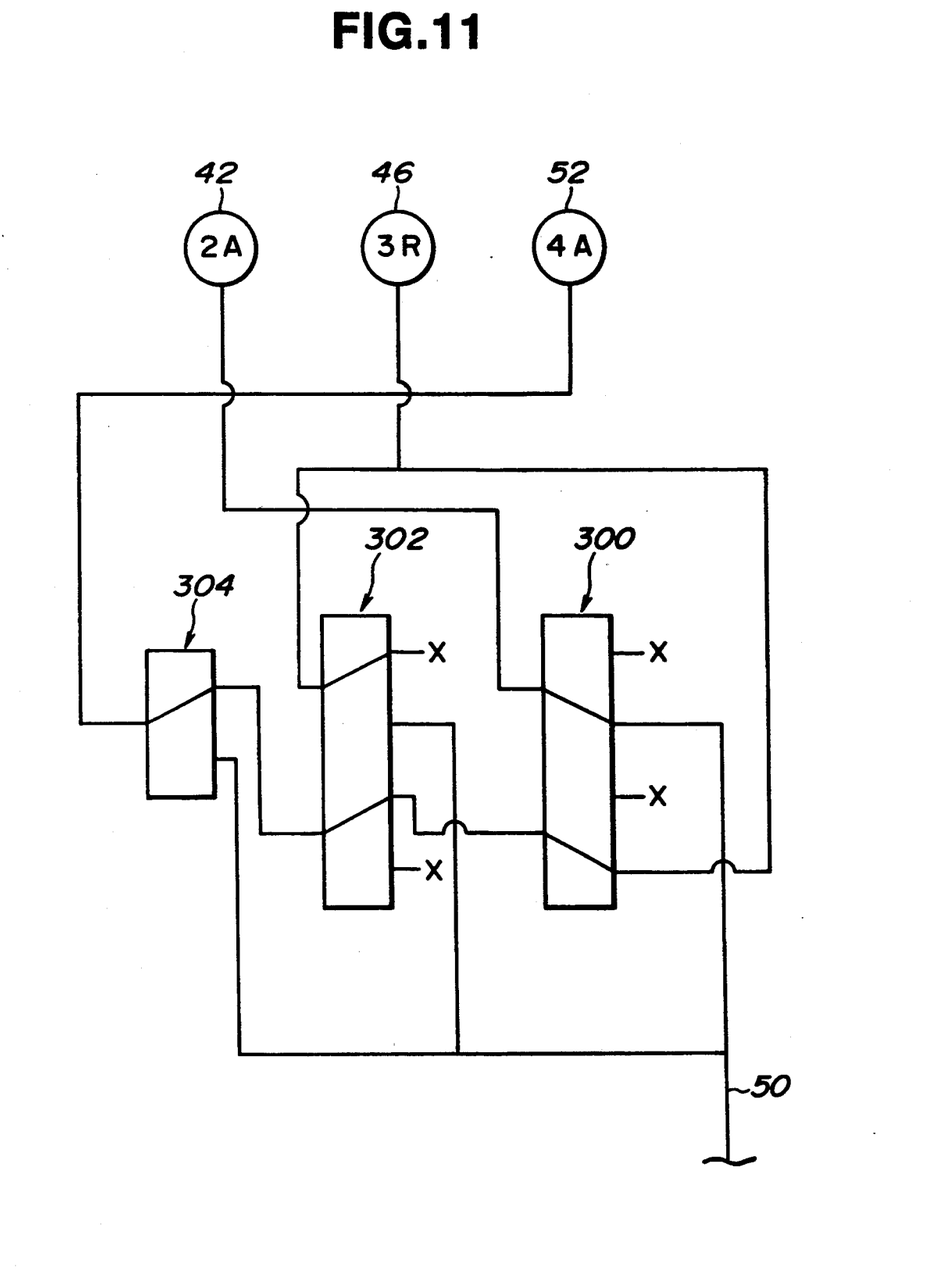
FIG. 11 is a view similar to FIG. 10, showing the hydraulic circuit of FIG. 10 upon second speed.

Referring next to FIG. 10, there is shown a third preferred embodiment of the present invention. In the same way as the second preferred embodiment, this embodiment provides three shift valves: a 1-2 shift valve 300, a 2-3 shift valve 302, and a 3-4 shift valve 304. The difference is that only upon fourth speed, the 3-4 shift valve 304 is switched from the position on the side of first, second, and third speeds. According to this embodiment, upon second speed, hydraulic pressure within the fourth speed apply chamber 52 and that one within the third speed release chamber 46 are discharged through the same hydraulic passage as shown in FIG. 11, obtaining the same operation as that of the above embodiments.

What is claimed is:

1. In an automatic transmission, the automatic transmission having a brake to be engaged at an N speed and an N+2 speed and released at an N+1 speed, said automatic transmission comprising:

a hydraulic servo apparatus arranged to control the brake, said hydraulic servo apparatus having an N speed apply chamber which engages the brake when undergoing hydraulic pressure, an N+1 speed release chamber which releases the brake when undergoing hydraulic pressure even with said N speed apply chamber undergoing hydraulic pressure and an N+2 speed apply chamber which engages the brake when undergoing hydraulic pressure regardless of the state of hydraulic pressure within said N speed apply chamber and said N+1 speed release chamber;

a plurality of shift valves hydraulically connected to said N speed apply chamber, said N+1 speed release chamber and said N+2 speed apply chamber, said plurality of shift valves controlling hydraulic pressure to be supplied to and discharged from said N speed apply chamber, said N+1 speed release chamber and said N+2 speed apply chamber;

a first hydraulic passage hydraulically connected to said N+2 speed apply chamber; and a second hydraulic passage hydraulically connected to said N+1 speed release chamber;

wherein said plurality of shift valves connect said first hydraulic passage to said second hydraulic passage to drain hydraulic pressure through a drain port upon the N speed; and wherein N is a whole number equal to or greater than 1.

* * * * *